United States Patent [19]

Tomita et al.

[11] Patent Number: 5,447,970
[45] Date of Patent: Sep. 5, 1995

[54] AQUEOUS DISPERSED RESIN COMPOSITION

[75] Inventors: Toyoji Tomita; Masahiro Aoki; Takeo Tsukamoto; Takeshi Awata; Ryutaro Hayashi, all of Mie, Japan

[73] Assignee: Mitsubishi Yuka Badische Co., Ltd., Yokkaichi, Japan

[21] Appl. No.: 224,518

[22] Filed: Apr. 7, 1994

[30] Foreign Application Priority Data

Apr. 7, 1993 [JP] Japan .................. 5-080533
Apr. 7, 1993 [JP] Japan .................. 5-080534

[51] Int. Cl.$^6$ .................. C08L 51/00; C08F 8/30
[52] U.S. Cl. .................. 523/201; 524/531; 524/804; 524/812; 524/831; 525/376; 525/385; 525/902
[58] Field of Search .................. 523/201; 524/504, 714, 524/812, 531, 804, 831; 525/301, 376, 377, 385, 902

[56] References Cited

U.S. PATENT DOCUMENTS

| | | | |
|---|---|---|---|
| 4,959,428 | 9/1990 | Abe et al. | 526/201 |
| 4,988,762 | 1/1991 | Overbeek et al. | 524/839 |
| 5,308,890 | 5/1994 | Snyder | 523/201 |

FOREIGN PATENT DOCUMENTS

| | | |
|---|---|---|
| 0151360 | 8/1985 | European Pat. Off. |
| 0219047 | 4/1987 | European Pat. Off. |
| 0296487 | 12/1988 | European Pat. Off. |
| 0458144 | 11/1991 | European Pat. Off. |
| 0555959 | 8/1993 | European Pat. Off. |

*Primary Examiner*—Tae H. Yoon
*Attorney, Agent, or Firm*—Oblon, Spivak, McClelland, Maier & Neustadt

[57] ABSTRACT

An aqueous dispersed resin composition is disclosed, comprising (A) an aqueous dispersion of carbonyl-containing resin particles having an inner layer and an outermost layer, which is obtained by emulsion polymerization of a monomer mixture comprising (a) not less than 0.5% by weight of a carbonyl-containing monomer containing at least one aldo group or keto group and one polymerizable unsaturated double bond in the molecule thereof, (b) not less than 0.5% by weight of an ethylenically unsaturated carboxylic acid, (c) not more than 99% by weight of a monomer having a water-solubility of not more than 8 g/100 ml at 20° C., and (d) not more than 99% by weight of an unsaturated monomer other than the monomers (a) to (c) in an aqueous medium in the presence of dispersed resin particles serving as an inner layer, (B) a hydrophilic compound comprising a hydrazine derivative containing at least two hydrazino groups in the molecule thereof, and (C) an epoxy-containing compound containing at least two epoxy groups in the molecule thereof, in which the resin constituting said outermost layer of said carbonyl-containing resin particles has a degree of solubilization of at least 5% by weight, and the resin constituting the whole resin particles has a degree of solubilization of from 4 to 50% by weight. The composition is easily crosslinked at room temperature to provide a film excellent in water resistance, resistance to whitening on contact with water, antiblocking properties, heat resistance, solvent resistance, adhesion and hardness, and is particularly useful as an adhesive composition.

17 Claims, No Drawings

AQUEOUS DISPERSED RESIN COMPOSITION

FIELD OF THE INVENTION

This invention relates to an aqueous dispersed resin composition ready to undergo crosslinking at room temperature to provide a film excellent in water resistance, resistance to whitening on contact with water, antiblocking properties, heat resistance, solvent resistance, adhesion, and hardness. The composition of the present invention has satisfactory workability because the drying properties are controllable and is easy to handle because it does not undergo gelation. It is useful as clear varnish for external application, a binder for stone finishing compounds, a top coat for such a stone finish, coating compounds such as OP varnish, printing inks, and textile assistants. Having excellent water-resistant adhesion, a moderate open time, and a long pot life, the composition is most suitable as an adhesive.

BACKGROUND OF THE INVENTION

An aqueous dispersed resin composition comprising a carbonyl-containing copolymer resin aqueous dispersion and a hydrazine derivative containing at least two hydrazino groups in the molecule thereof is known (see, e.g., JP-A-57-3850, JP-A-64-48801 (the term "JP-A" as used herein means an "unexamined published Japanese patent application"), U.S. Pat. Nos. 4,267,091, 4,210,565, 5,208,282 and 4,959,428 and JP-B-1-13501 (the term "JP-B" as used herein means an "examined published Japanese patent application"). This composition easily undergoes crosslinking at room temperature to provide a film having various excellent physical properties. However, it rapidly dries after application, tending to suffer from unevenness of coating or cracks due to shrinkage stress.

In order to overcome these disadvantages, use of a large quantity of an emulsifying agent or addition of a wetting agent or a water-soluble resin has been attempted, but either attempt results in reduction in water resistance of a film to an impractical level.

In order to improve water resistance, external addition of an epoxy-containing compound or use of an epoxy-containing monomer as one of monomers constituting an aqueous resin dispersion has been proposed. The aqueous resin dispersions of this type exhibit improved water resistance but are apt to undergo gelation on account of the epoxy group. Therefore, the composition must be supplied as a two-pack type of formulation, which is troublesome to handle.

SUMMARY OF THE INVENTION

An object of the present invention is to provide an aqueous dispersed resin composition which easily undergoes crosslinking at room temperature to provide a film excellent in water resistance, resistance to whitening on contact with water, antiblocking properties, heat resistance, solvent resistance, adhesion and hardness.

Another object of the present invention is to provide an aqueous dispersed resin composition which has controllable surface drying properties and thereby exhibits satisfactory workability and which does not undergo gelation and thereby has ease in handling.

As a result of extensive investigations, the present inventors have found that the above objects of the present invention are accomplished by a combination of (A) an aqueous resin dispersion in which resin particles have an inner layer and an outermost layer and at least the outermost layer contains a carbonyl group, the outermost layer and the whole resin particles each having a specific degree of solubilization, (B) a hydrophilic compound comprising a hydrazine derivative, and (C) an epoxy-containing compound. The present invention has been completed based on this finding.

The present invention relates to an aqueous dispersed resin composition comprising (A) an aqueous dispersion of carbonyl-containing resin particles having an inner layer and an outermost layer, which is obtained by emulsion polymerization of a monomer mixture comprising (a) not less than 0.5% by weight of a carbonyl-containing monomer containing at least one aldo group or keto group and one polymerizable unsaturated double bond in the molecule thereof, (b) not less than 0.5% by weight of an ethylenically unsaturated carboxylic acid, (c) not more than 99% by weight of a monomer having a water-solubility of not more than 8 g/100 ml at 20° C., and (d) not more than 99% by weight of an unsaturated monomer other than the monomers (a) to (c) in an aqueous medium in the presence of dispersed resin particles serving as an inner layer, (B) a hydrophilic compound comprising a hydrazine derivative containing at least two hydrazino groups in the molecule thereof, and (C) an epoxy-containing compound containing at least two epoxy groups in the molecule thereof, in which the resin constituting the outermost layer of the carbonyl-containing resin particles has a degree of solubilization of at least 5% by weight, and the resin constituting the whole resin particles has a degree of solubilization of from 4 to 50% by weight.

DETAILED DESCRIPTION OF THE INVENTION

In the present invention, where resin particles in aqueous dispersion (A) has three or more layers, all the layers other than the outermost layer will be called "inner layers". The term "outermost layer" as used herein includes not only the outermost one of three or more layers but the outer layer of double-layered resin particles.

In order to achieve improvements in various physical properties by solubilization in good balance with water resistance, the resin constituting the outermost layer of carbonyl-containing resin particles of aqueous dispersion (A) is prepared from a monomer mixture comprising (a) a carbonyl-containing monomer containing at least one aldo group or keto group and one polymerizable unsaturated double bond in the molecule thereof and (b) an ethylenically unsaturated carboxylic acid, and if desired, (c) a monomer having a water-solubility of not more than 8 g/100 ml at 20° C. and (d) other unsaturated monomers. The combination of monomers (a) to (d) is also preferred as the resin constituting the inner layer(s) of the resin particles.

Monomer (a) which can be used for preparing aqueous resin dispersion (A) includes acrolein, diacetone acrylamide, formylstyrol, a vinyl alkyl ketone having 4 to 7 carbon atoms (e.g., vinyl methyl ketone, vinyl ethyl ketone or vinyl butyl ketone), diacetone acrylate, acetonyl acrylate, diacetone methacrylate, 2-hydroxypropyl acrylate acetylacetate, 1,4-butanediol acrylate acetylacetate, and a (meth)acryloxyalkyl-propenal represented by formula:

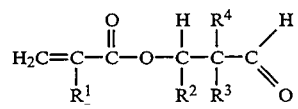

wherein R[1] represents a hydrogen atom or a methyl group; R[2] represents a hydrogen atom or an alkyl group having from 1 to 3 carbon atoms; R[3] represents an alkyl group having from 1 to 3 carbon atoms; and R[4] represents an alkyl group having from 1 to 4 carbon atoms. Preferred monomers (a) are diacetone acrylamide, acrolein, and vinyl methyl ketone. These monomers may be used either individually or in combination of two or more thereof.

Monomer (a) is essential for the outermost layer of the resin particles. For ensuring improvement in film water resistance, monomer (a) is preferably present in both the outermost and inner layer(s). Monomer (a) in the outermost layer should be used in an amount of not less than 0.5% by weight, preferably from 2 to 20% by weight, based on the total monomers constituting the outermost layer. Monomer (a) in the whole inner layer(s) preferably used in an amount of not less than 0.5% by weight, more preferably from 1 to 15% by weight, based on the total monomers constituting the whole inner layer(s). If the proportion of monomer (a) is too small, hydrazine derivative-induced crosslinking does not proceed sufficiently, failing to obtain a desired improvement in water resistance. If it is too large, no further improvement in physical properties tends to be obtained, and the resulting film tends to become too brittle for practical use.

Monomer (b) which can be used for preparing aqueous resin dispersion (A) may be a monocarboxylic acid or a polycarboxylic acid and is preferably a mono- or diolefinic unsaturated carboxylic acid having from 3 to 5 carbon atoms and particularly acrylic acid, methacrylic acid or itaconic acid.

Monomer (b) in the outermost layer is used in an amount of not less than 0.5% by weight based on the total monomers constituting the outermost layer. If the proportion of monomer (b) in the outermost layer is too small, water solubilization by addition of an alkali and/or an organic solvent as hereinafter described cannot be effected sufficiently, resulting in a failure of obtaining a film having sufficient smoothness, adhesion to a substrate, gloss and resistance to whitening on contact with water. If the proportion of monomer (b) in the outermost layer is too large, the resulting film tends to have reduced water resistance and, as a result, deteriorate the adhesion to a substrate.

Monomer (b) in the whole inner layer(s) other than the outermost layer is preferably used in an amount of up to 4% by weight, more preferably from 0.5 to 3% by weight, based on the total monomers constituting the whole inner layer(s). If the proportion of this monomer in the inner layer is too large, the water resistance of the resulting film tends to be reduced.

Where monomer (b) in the outermost layer is used in an amount of from 0.5 to 5% by weight and particularly from 2 to 5% by weight, the polymerization of monomers is preferably conducted in the presence of a chain transfer agent. In general, a copolymer resin prepared by emulsion polymerization has a high molecular weight and is therefore hardly solubilized. Use of a chain transfer agent is effective to reduce the molecular weight of the copolymer produced thereby making solubilization easier. On the other hand, where the amount of monomer (b) in the outermost layer exceeds 5% by weight, preferably more than 5 and not more than 40% by weight, since solubilization of the resulting polymer is easier than in the above-mentioned case, a chain transfer agent is not essential. However, use of a chain transfer agent is also preferred in this case for ensuring the ease of solubilization and the improvements in various physical properties.

Any chain transfer agent generally employed in homo- or copolymerization of vinyl monomers can be used in the present invention. Suitable chain transfer agents include various mercaptan compounds, such as methyl mercaptan, t-butyl mercaptan, decyl mercaptan, benzyl mercaptan, lauryl mercaptan, stearyl mercaptan, n-dodecyl mercaptan, t-dodecyl mercaptan, mercaptoacetic acid, and mercaptopropionic acid; alcohols, such as methanol, n-propanol, isopropanol, t-butanol, benzyl alcohol, and allyl alcohol; hydrocarbons, such as ethylbenzene and cumene; and halogenated hydrocarbons, such as chloroethane, chloroform, carbon tetrachloride, and carbon tetrabromide. The chain transfer agent is effectively added when a monomer mixture for an outermost layer is polymerized. The chain transfer agent is usually used in an amount of from 0.01 to 3 parts by weight, preferably from 0.02 to 2.5 parts by weight, per 100 parts by weight of the monomer mixture for the outermost layer.

Monomer (c) which may be used for preparing aqueous resin dispersion (A) is a monomer copolymerizable with monomers (a) and (b) and having a water solubility of not more than 8 g/100 ml at 20° C. Suitable monomers (c) include acrylic or methacrylic esters of saturated alkanols having 1 to 10 carbon atoms, such as methyl acrylate, methyl methacrylate, ethyl acrylate, butyl acrylate, butyl methacrylate, and 2-ethylhexyl acrylate; aromatic vinyl compounds, such as styrene; vinyl halides, such as vinyl chloride and vinylidene chloride; unsaturated hydrocarbons, such as ethylene and butadiene; vinyl esters, such as vinyl acetate and vinyl propionate; acrylonitrile, methacrylonitrile, and glycidyl methacrylate.

Monomer (c) in the outermost layer can be used in an amount of not more than 99% by weight, preferably from 30 to 99% by weight, more preferably from 55 to 96% by weight, particularly preferably from 55 to 93% by weight, based on the total monomers constituting the outermost layer. If the proportion of monomer (c) in the outermost layer is too small, the resulting film tends to have reduced water resistance or become brittle. If it is too large, the film tends to have reduced water resistance and reduced adhesion to a substrate.

It is preferable that monomer (c) in the whole inner layer(s) other than the outermost layer is used in an amount up to 99.5% by weight, more preferably from 82 to 98.5% by weight, based on the total monomers constituting the whole inner layer(s). If the proportion of monomer (c) in the inner layer is too small, the resulting film tends to have reduced water resistance or become brittle.

Monomer (d) which may be used for preparing aqueous resin dispersion (A) is an unsaturated monomer other than monomers (a) to (c). Monomer (d) includes unsaturated amides, such as acrylamide and methacrylamide; hydroxyl-containing monomers, such as hydroxyethyl acrylate and hydroxypropyl acrylate; sulfonated monomers, such as vinylsulfonic acid, styrenesulfonic acid and salts thereof; and N-methylolacrylamide. Monomer (d) in the outermost layer constituting the resin particles can be used in an amount of not more than 99% by weight, preferably not more than 69% by weight, more preferably up to 15% by weight, based on the total unsaturated monomers constituting the outermost layer. Monomer (d) in the whole inner layer(s) constituting the resin particles can be used in an amount of not more than 99% by weight, preferably not more than 69% by weight, more preferably up to 15% by weight, based on the total unsaturated monomers constituting the whole inner layer(s). If the proportion of monomer (d) in each layer exceeds the above-mentioned upper limit, the resin particles become excessively hydrophilic, tending to provide a film having reduced water resistance.

Where the aqueous dispersed resin composition is used as an adhesive, it is preferable that the inner layer(s) of the resin particles is prepared from a monomer mixture comprising from 2 to 10% by weight of monomer (a), from 0.5 to 2% by weight of monomer (b), from 88 to 97.5% by weight of monomer (c), and up to 15% by weight of monomer (d) and that the outermost layer is prepared from a monomer mixture comprising from 2 to 20% by weight of monomer (a), from 2 to 5% by weight of monomer (b), from 75 to 96% by weight of monomer (c), and up to 15% by weight of monomer (d) or a monomer mixture comprising from 2 to 20% by weight of monomer (a), from 5 to 15% by weight of monomer (b), from 65 to 93% by weight of monomer (c), and up to 15% by weight of monomer (d). In the case of using the former monomer mixture for the outermost layer, a chain transfer agent needs to be used. In the case of using the latter monomer mixture for the outermost layer, a chain transfer agent does not always need to be used.

With respect to the composition for use as an adhesive, if the proportion of monomer (a) is too small, hydrazine derivative-induced crosslinking tends to be insufficient, failing to obtain a desired improvement in water resistance. If it is too large, no further improvements in physical properties is obtained, and the resulting film tends to be too brittle for practical use.

If the proportion of monomer (b) in the outermost layer is too small, water solubilization by addition of an alkali and/or an organic solvent as hereinafter described cannot be effected sufficiently. It would follow that the coated adhesive dries so rapidly, making it difficult to adhere the entire area or to conduct adhesion over again, resulting in reduced workability. If the proportion of monomer (b) in the outermost layer is too large, the resulting adhesive layer tends to have reduced water resistance and, as a result, deteriorate the adhesion to a substrate. If the proportion of monomer (b) in the inner layer is too large, the film tends to have reduced water-resistant adhesion.

If the proportion of monomer (c) in the outermost layer is too small, the resulting film tends to have reduced water-resistant adhesion. If it is too large, the composition tends to have a shortened open time or the adhesive layer tends to have reduced water-resistant adhesion. If the amount of monomer (c) in the inner layer is too small, the adhesive layer tends to have reduced water-resistant adhesion.

If the proportion of monomer (d) is too large, the resin particles tends to become excessively hydrophilic, and the resulting adhesive layer tends to have reduced water resistance.

Aqueous resin dispersion (A) containing resin particles composed of at least two layers can be prepared by previously polymerizing a monomer mixture for an inner layer in water to prepare an emulsion and then adding a monomer mixture for the outermost layer to the emulsion, followed by emulsion polymerization.

Emulsion polymerization of a monomer mixture for each layer formation can be carried out by using a water-soluble polymerization initiator in combination with an emulsifying agent or by soap-free polymerization. Usable emulsifying agents include various anionic, cationic or nonionic emulsifying agents and high polymeric emulsifying agents. In particular, the carbonyl-containing high polymeric emulsifying agents disclosed in JP-A-64-48801 (corresponding to U.S. Pat. No. 4,959,428) are preferred.

Polymerization initiators which can be used in emulsion polymerization preferably include inorganic peroxides, such as potassium persulfate, ammonium persulfate, and hydrogen peroxide. These inorganic peroxides may be used in the form of a redox initiator in combination with a reducing agent.

In carrying out emulsion polymerization, monomers may be fed in various modes, including all-at-once addition, monomer addition, and emulsion addition. Seed polymerization, in which the composition of the monomer mixture to be fed is varied with time, or power feed polymerization may also be adopted. By using these methods, the resulting resin particles can have its copolymer composition varied between the central portion and the peripheral portion so that the degree of solubilization may be controlled.

The thus prepared aqueous resin dispersion (A) contains resin particles having been solubilized by addition of an alkali and/or an organic solvent in such a manner that the outermost layer thereof may have a degree of solubilization of at least 5% by weight, preferably not less than 15% by weight, and the whole particles may have a degree of solubilization of from 4 to 50% by weight, preferably from 5 to 35% by weight. The inner layer of the resin particles preferably has a degree of solubilization of less than 30% by weight, preferably from 0.3 to 25% by weight.

If the degree of solubilization of the whole resin particles is too low, the resulting film has reduced adhesion to a substrate and reduced gloss. If it is too high, the film has reduced water resistance.

Where the composition is used as an adhesive, the inner layer preferably has a degree of solubilization of not more than 10% by weight, preferably less than 5% by weight, and the whole particles preferably have a degree of solubilization of from 6 to 30% by weight.

If the degree of solubilization of the resin particles as a whole is too low, the drying rate of the film is too high for sufficient workability. If it is too high, the resulting film tends to have reduced water resistance.

Solubilization by addition of an alkali and/or an organic solvent may be conducted before the commencement of copolymerization for the preparation of aqueous resin dispersion (A) or during that copolymerization. In either case, the terminology "degree of solubilization" as used herein means a degree of solubilization obtained as follows.

An aqueous resin dispersion is prepared and solubilized under quite the same conditions as actually used for preparing the aqueous dispersed resin composition of the present invention, except for adding neither hydrazine derivative (B) nor epoxy-containing compound (C). The resulting resin dispersion is diluted with water so as to have a nonvolatile content of 15% by weight. The nonvolatile content (W part by weight) of the resulting diluted resin dispersion is measured. The diluted resin dispersion is then centrifuged at centrifugal acceleration of $1.8 \times 10^5$ g for 60 minutes, and the nonvolatile content (w part by weight) in the supernatant liquor is measured. The degree of solubilization (wt %) is calculated from equation:

Degree of Solubilization $= w/W \times 100$ (wt %)

Accordingly, where an alkali and/or an organic solvent is added before or during emulsion polymerization for preparing aqueous resin dispersion (A), and the copolymer resin as produced has a degree of solubilization of 5% by weight or more, the resulting copolymer resin as obtained serves as aqueous resin dispersion (A) without any positive addition of an alkali and/or an organic solvent for solubilization.

The degree of solubilization of the outermost layer or the inner layer can be measured in the same manner as described above by using a polymer separately prepared from a monomer mixture for the outermost layer or the inner layer under the same conditions as used for preparing the resin particles of aqueous resin dispersion (A).

Alkalis which can be used for solubilization include inorganic water-soluble alkalis, e.g., sodium hydroxide and potassium hydroxide; inorganic salts capable of providing an alkaline aqueous solution, e.g., sodium hydrogencarbonate and sodium pyrophosphate; aqueous ammonia; and organic amines. As previously stated, addition of an alkali does not always need to be done after production of the copolymer. In other words, in some cases, a monomer may be neutralized by addition of an alkali and then subjected to copolymerization. The amount of the alkali to be used may be such for either complete or partial neutralization of the carboxyl groups in the copolymer resin.

An organic solvent may be supplementarily used where alkali addition is insufficient for desired water solubilization, or solubilization as desired may be effected only by addition of an organic solvent.

Organic solvents which can be used for solubilization include texanol, ethylene glycol monobutyl ether, ethylene glycol monoethyl ether and their acetate, benzyl alcohol, butyl carbitol acetate, and 2,2,4-trimethyl-1,3-pentanediol.

The aqueous dispersed resin composition according to the present invention comprises the above-mentioned aqueous resin dispersion (A) having incorporated thereinto hydrophilic compound (B) comprising a hydrazine derivative having at least two hydrazino groups in the molecule thereof and epoxy-containing compound (C) having at least two epoxy groups in the molecule thereof.

Component (B) includes dicarboxylic acid dihydrazides having, for example, from 2 to 10, and preferably from 4 to 6, carbon atoms, such as oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide, and itaconic acid dihydrazide; and aliphatic water-soluble dihydrazines having from 2 to 4 carbon atoms, such as ethylene-1,2dihydrazine, propylene-1,3-dihydrazine, and butylene-1,4dihydrazine.

Also included in component (B) are polymers represented by formula:

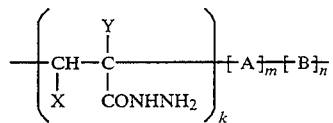

wherein X represents a hydrogen atom or a carboxyl group; Y represents a hydrogen atom or a methyl group; A represents a unit derived from acrylamide, methacrylamide, an acrylic ester, a methacrylic ester or maleic anhydride; B represents a unit derived from a monomer copolymerizable with the monomer of unit A; and k, m, and n each represents a number satisfying formulae:

$2$ mol % $\leq k \leq 100$ mol %

$0$ mol % $\leq (m+n) \leq 98$ mol %

$(k+m+n) = 100$ mol %

The details of these polymers are described, e.g., in JP-A-55-6535 (corresponding to U.S. Pat. No. 4,230,525).

The epoxy-containing compound having at least two epoxy groups in the molecule thereof as component (C) includes polyglycidyl ethers of polyhydric alcohols, such as ethylene glycol diglycidyl ether, polyethylene glycol diglycidyl ether, glycerin diglycidyl ether, glycerin triglycidyl ether, propylene glycol diglycidyl ether, and polypropylene glycol diglycidyl ether; alicyclic epoxy resins, such as bisphenol A glycidyl ether; nitrogen-containing epoxy resins, polybutadiene type epoxy resins, and urethane-modified epoxy resins.

Component (C) is preferably used in an amount of from 0.1 to 100 parts by weight, more preferably from 0.3 to 60 parts by weight, per 100 parts by weight of the solids content of component (A). If the proportion of component (C) is too low, the improvements in film properties tend to be insufficient. If it is too large, the composition tends to become tacky or undergo gelation, resulting in reduced workability.

Component (B) is preferably used in such an amount that the molar ratio of the sum of carbonyl groups (i.e., aldo groups, and keto groups) in the carbonyl-containing resin particles of component (A), and epoxy groups in component (C) to hydrazino groups in component (B) in the composition falls within a range of from 0.2 to 8, and more preferably from 0.5 to 4. If the proportion of the hydrazine derivative is too small, crosslinking among polymer molecules is insufficient in order for the aqueous resin dispersion to provide a coating film with improved water resistance. Even if the hydrazine derivative is used excessively, no further improvement in water resistance results and, besides, the film tends to become inferior-transparent and brittle, and the crosslinking effects are reduced.

Where the composition is used as an adhesive, component (C) is preferably used in an amount of from 0.4 to 100 parts by weight, and more preferably from 1.0 to 60 parts by weight, per 100 parts by weight of the solids content of component (A). If the proportion of component (C) is too small, sufficient improvement in adhesive strength cannot be obtained. If it is too large, the water-resistant adhesion tends to be reduced.

If desired, the aqueous dispersed resin composition of the present invention may contain other components or additives, such as synthetic resin emulsions, synthetic rubber latices, modifiers such as tackifiers, extenders, such as inorganic fillers, thickeners, viscosity-controlling agents, defoamers, and the like.

The present invention will now be illustrated in greater detail with reference to Examples and Comparative Examples. All the parts and percents are given by weight unless otherwise indicated.

EXAMPLE 1

A reactor equipped with a temperature controller, an anchor stirrer, a reflux condenser, a feeder, a thermometer, and an inlet for nitrogen was purged with nitrogen, and the following composition was charged therein.

| | |
|---|---|
| Water | 35 parts |
| Sodium salt of a sulfuric acid half-ester of an ethylene oxide (20 mol) adduct of p-nonyl phenol (hereinafter referred to as anionic emulsifying agent A) (35% aqueous solution) | 1.8 parts |
| Ethylene oxide (25 mol) adduct of p-nonyl phenol (hereinafter referred to as nonionic emulsifying agent B) (20% aqueous solution) | 2 parts |

Separately, mixtures I, II and III having the following compositions were prepared.

| | |
|---|---|
| Mixture I: | |
| Water | 35 parts |
| 35% Aqueous solution of anionic emulsifying agent A | 3.7 parts |
| 20% Aqueous solution of nonionic emulsifying agent B | 3.5 parts |
| Styrene | 37.5 parts |
| Butyl acrylate | 37.1 parts |
| Diacetone acrylamide | 4.0 parts |
| Acrylic acid | 0.4 part |
| Mixture II: | |
| Water | 8 parts |
| 35% Aqueous solution of anionic emulsifying agent A | 0.8 part |
| 20% Aqueous solution of nonionic emulsifying agent B | 1.05 part |
| Styrene | 1.5 parts |
| Methyl methacrylate | 3.6 parts |
| Butyl acrylate | 13.9 parts |
| Diacetone acrylamide | 1.0 part |
| Acrylic acid | 1.0 parts |
| t-Dodecylmercaptan | 0.2 part |
| Mixture III: | |
| Water | 12 parts |
| Potassium persulfate | 0.5 part |

To the reactor was added 10% of mixture I, and the resulting mixture was heated to 85° C. Ten percents of mixture III was fed. Ten minutes later, the rest of mixture I was added thereto over a period of 3 hours. After one hour from the completion of addition of mixture I, mixture II was slowly fed to the reactor over 1 hour. The rest of mixture III was continuously fed at a constant rate from the start of addition of mixture I to the end of addition of mixture II. After the addition, the reaction mixture was maintained at 90° C. for an additional period of 1.5 hours to complete emulsion polymerization. The resulting aqueous resin dispersion had a nonvolatile content of about 50%.

The aqueous resin dispersion was adjusted to a pH of 9.3 with aqueous ammonia, and to the dispersion were added 10 parts of benzyl alcohol as a solvent, 25.7 parts of a 20% aqueous solution of adipic acid dihydrazide, and 2.6 parts of ethylene glycol glycidyl ether. The viscosity was adjusted to 5,000 to 8,000 cps by addition of water to obtain an aqueous dispersed resin composition. The degree of solubilization of the outer layer resin was 95%, and that of the whole resin particles was 11.3%.

EXAMPLES 2 TO 9 AND COMPARATIVE EXAMPLES 1 TO 5

An aqueous dispersed resin composition was prepared in the same manner as in Example 1, except for making alterations as shown in Tables 1 and 2 below. The amounts of water and emulsifying agents in each of mixtures to be fed were distributed in each layer in proportion to the weight of the respective monomer mixture.

TABLE 1

| | Example 1 | Example 2 | Example 3 | Example 4 | Example 5 | Example 6 | Example 7 |
|---|---|---|---|---|---|---|---|
| Monomer Composition (part): | | | | | | | |
| Inner Layer: | | | | | | | |
| Diacetone acrylamide | 4.0 | 9.2 | 3.5 | — | 12.8 | 11.9 | 3.5 |
| Acrylic acid | 0.4 | 1.8 | 1.0 | 0.3 | 2.0 | 1.9 | 1.4 |
| Methacrylic acid | — | — | — | 0.3 | — | — | — |
| Methyl methacrylate | — | 53.4 | 26.2 | 22.1 | 37.9 | 35.2 | 23.1 |
| Butyl acrylate | 37.1 | 27.6 | — | 29.8 | 32.3 | 30.0 | 28.0 |
| 2-Ethylhexyl acrylate | — | — | 39.3 | — | — | — | — |
| Styrene | 37.5 | — | — | 7.2 | — | — | 14.0 |
| 2-Ethylhexyl acrylate | — | — | — | 0.3 | — | — | — |
| Outer Layer: | | | | | | | |
| Diacetone acrylamide | 1.0 | 0.4 | 1.4 | 6.0 | 0.7 | 1.0 | 3.0 |
| Acrylic acid | 1.0 | 0.4 | 3.6 | 1.0 | 1.8 | 0.2 | 0.9 |
| Methacrylic acid | — | — | 2.1 | — | 1.1 | — | — |
| Methyl methacrylate | 3.6 | 1.4 | 12.1 | 17.8 | 6.0 | — | 14.1 |
| Butyl acrylate | 13.9 | 5.2 | — | 15.2 | — | 9.6 | 12.0 |
| Styrene | 1.5 | 0.6 | — | — | — | 10.2 | — |
| 2-Ethylhexyl acrylate | — | — | 10.8 | — | 5.4 | — | — |
| t-Dodecylmercaptan | 0.2 | 0.1 | 0.3 | 0.4 | 0.2 | 0.2 | 0.1 |
| Solvent | BA[1] | BA | — | BC[2] | BC | BC | BA |
| (part) | (10.0) | (14.0) | — | (12.0) | (12.0) | (12.0) | (12.0) |
| Alkali | AQ[3] | — | SH[4] | AQ | AQ | AQ | AQ |
| (pH) | (9.3) | (2.8) | (9.5) | (9.2) | (9.2) | (9.2) | (9.0) |
| Hydrazine derivative | ADH[5] | ADH | ADH | ADH | ADH | ADH | ADH |

TABLE 1-continued

|  | Example 1 | Example 2 | Example 3 | Example 4 | Example 5 | Example 6 | Example 7 |
|---|---|---|---|---|---|---|---|
| (part) | (25.7) | (13.1) | (15.7) | (18.3) | (26.1) | (39.2) | (17.7) |
| Epoxy-containing compound | EG[6] | GG[7] | EG | EG | GG | EG | EG |
| (part) | (2.6) | (4.6) | (10.0) | (1.3) | (3.5) | (1.2) | (3.1) |
| Carbonyl + Epoxy/Hydrazino molar ratio | 1.0 | 2.5 | 4.0 | 1.2 | 2.0 | 2.5 | 1.8 |

TABLE 2

|  | Example 8 | Example 9 | Compar. Example 1 | Compar. Example 2 | Compar. Example 3 | Compar. Example 4 | Compar. Example 5 |
|---|---|---|---|---|---|---|---|
| Monomer Composition (part): | | | | | | | |
| Inner Layer: | | | | | | | |
| Diacetone acrylamide | 3.5 | 3.0 | 9.2 | 6.5 | 7.9 | 6.0 | 3.5 |
| Acrylic acid | 1.0 | 4.0 | 1.8 | 1.3 | 1.6 | 1.9 | 1.4 |
| Methacrylic acid | — | — | — | — | — | — | — |
| Methyl methacrylate | 26.2 | 47.0 | 53.4 | 37.7 | 45.8 | 28.1 | 23.1 |
| Butyl acrylate | — | — | 27.6 | 19.5 | 23.7 | 24.0 | 28.0 |
| 2-Ethylhexyl acrylate | 39.3 | 31.0 | — | — | — | — | — |
| Styrene | — | — | — | — | — | — | 14.0 |
| 2-Hydroxyethyl acrylate | — | — | — | — | — | — | — |
| Outer Layer: | | | | | | | |
| Diacetone acrylamide | 1.4 | 0.7 | 0.4 | — | 1.1 | 2.0 | 3.0 |
| Acrylic acid | 3.6 | 1.8 | 0.4 | 2.5 | 0.3 | 2.0 | 0.9 |
| Methacrylic acid | 2.1 | 1.1 | — | — | — | — | — |
| Methyl methacrylate | 12.1 | 6.0 | 1.4 | 25.5 | 10.2 | 7.0 | 14.1 |
| Butyl acrylate | — | — | 5.2 | — | — | 26.0 | 12.0 |
| Styrene | — | — | 0.6 | — | — | 3.0 | — |
| 2-Ethylhexyl acrylate | 10.8 | 5.4 | — | 7.0 | 9.4 | — | — |
| t-Dodecylmercaptan | 0.3 | 0.2 | 0.1 | 0.3 | 0.2 | 0.5 | — |
| Solvent | BC | texanol | BA | BA | BC | BA | BA |
| (part) | (15.0) | (6.0) | (10.0) | (10.0) | (16.0) | (10.0) | (12.0) |
| Alkali | AQ | AQ | AQ | AQ | AQ | AQ | AQ |
| (pH) | (9.3) | (9.2) | (9.3) | (9.3) | (9.3) | (9.3) | (9.0) |
| Hydrazine derivative | ADH | ADH | ADH | ADH | ADH | ADH | ADH |
| (part) | (8.5) | (24.5) | (38.3) | (16.7) | (23.2) | (31.6) | (17.7) |
| Epoxy-containing compound | EG | GG | — | EG | EG | EG | EG |
| (part) | (14.4) | (3.5) | — | (1.7) | (2.3) | (2.2) | (3.1) |
| Carbonyl + Epoxy/Hydrazino molar ratio | 10.0 | 1.0 | 0.6 | 1.5 | 1.5 | 2.0 | 1.8 |

Note:
[1] BA: benzyl alcohol
[2] BC: butyl cellosolve (ethylene glycol monobutyl ether)
[3] AQ: aqueous ammonia
[4] SH: sodium hydroxide (5% aqueous solution)
[5] ADH: a 20% aqueous solution of adipic acid dihydrazide
[6] EG: ethylene glycol diglycidyl ether
[7] GG: Glycerin diglycidyl ether Each of the aqueous dispersed resin compositions prepared in Examples 1 to 9 and Comparative Examples 1 to 5 was evaluated according to the following test methods. The results of evaluation are shown in Tables 3 and 4 below.

1) Appearance of Film:

The composition was applied to a glass plate in a room kept at 20° C. and 60% RH to a thickness of 200 μm with a doctor knife and allowed to dry in a place having no wind for 5 days. The surface conditions of the film were observed with the naked eye and by touch. A colorless transparent film with a mirror surface and no extract on the surface was rated "normal". Otherwise, any surface defect was recorded.

2) Resistance to Whitening on Contact with Water:

The same specimen as prepared in 1) above was immersed in water at 20° C. or 40° C. for 7 days at an inclination of 70° with the film side up, and any color change of the film was observed. The degree of whitening increases in the order of colorless, pale blue, bluish white and white.

3) Degree of Swelling with Toluene:

The composition was cast on a Teflon-coated glass plate to a dry thickness of about 500 μm and dried at 20° C. for 7 days. On the 5th day of drying, the film was stripped from the plate and further dried upside down. The cast film was punched out to obtain a specimen of 5 cm×5 cm.

The specimen was immersed in toluene at 20° C. for 24 hours, and the side length was measured with a slide gauge. The degree of swelling with toluene was obtained from equation:

Degree of toluene swelling (%)=[(Side length after immersion−Side length before immersion)/Side length before immersion]×100

4) Water Absorption:

The same specimen as prepared in 3) above was immersed in water at 20° C. for 2 days. After taking out of water, the surface water was rapidly wiped away, and the specimen was precisely weighed to obtain a water absorption (%).

Further, 100 parts (solid base) of the composition was mixed with 0.5 part of a defoamer ("Foamaster AP" produced by San Nopco Co., Ltd.), 320 parts of ceramics powder (100 mesh), and 80 parts of calcium carbonate ("Kansui KD" produced by Dowa Mining Co., Ltd.; 50 mesh) to prepare a coating compound. Coating properties of the resulting coating compound were evaluated according to the following test methods. The results obtained are also shown in Tables 3 and 4.

5) Roll Coating Properties:

A solvent-type sealing compound ("Kikusui Primer BS" produced by Kikusui Kagaku Kogyo K.K.) was applied to a 300 mm wide and 450 mm long flexible plate to a wet thickness of 100 g/m² and dried. The coating compound was then applied thereon with a corrugated roll for exterior coating to a coating weight of 1.5 kg/m² to give a striped pattern. After drying for 5 minutes, the coating compound was again applied to ⅓ the coated area with the same roll to superpose a striped pattern on the previous one. The coating properties were evaluated by checking excessive pickup of the coating compound by the roll and any noticeable disturbance of the pattern (e.g., peeling and difference in level) at the overlap and rated "good", "medium" or "poor".

6) Tack-free Time:

The surface of the coated panel prepared in 5) above was touched with a finger every 2 minutes to determine the tack-free time (min).

7) Appearance of Coat:

The coated panel of 5) above was dried at 20° C. for 7 days, and the appearance of the coat was evaluated by visual observation and a finger test. A coat with neither sliminess nor surface defects such as cracks due to shrinkage stress was rated "normal". Otherwise, any surface defect was recorded.

8) Resistance to Whitening on Contact with Warm Water:

A solvent-type sealing compound (Kikusui Primer BS) was applied to a 70 mm wide and 150 mm long flexible plate to a wet thickness of 100 g/m² and dried. A 2 mm thick frame was fixed to the plate, and the coating compound was uniformly applied on the plate to the level of the frame (thickness: 2 mm) with a trowel and dried at 20° C. for 5 days to prepare a specimen. On the 4th day of drying, the reverse and the sides of the specimen were sealed with a wax. The specimen was immersed in water at 40° C. for 7 days, and the degree of whitening was evaluated in the same manner as described above.

9) Resistance to Softening with Warm Water:

The same specimen as prepared in 8) above was immersed in water at 40° C. for 7 days. After the immersion, the coat was scratched with a nail, and resistance to softening with warm water was rated as follows.

Good ... The coat did not allow a nail to plunge into.
Medium ... The coat allowed a nail to plunge into but was not easily broken.
Poor ... The coat was brittle and easily broken.

10) Antiblocking Properties:

The same specimen as prepared in (8) above was put in a thermostat at 50° C., and kraft paper was put thereon under a 500 g weight (diameter: 40 mm) for 24 hours. After the weight was removed, the specimen was further allowed to stand at 20° C. for 3 hours. The antiblocking properties of the coat was evaluated from the way how the paper was stripped off according to the following rating system.

Good ... Stripping made almost no sound.
Medium ... The half area or more of the paper stuck to the coat, but stripping needed no force and made only small sound.
Poor ... The entire area of the paper stuck to the coat, and stripping needed force and made a considerable sound.

TABLE 3

|  | Example 1 | Example 2 | Example 3 | Example 4 | Example 5 | Example 6 | Example 7 |
|---|---|---|---|---|---|---|---|
| Degree of Solubilization (%): | | | | | | | |
| Whole | 11.3 | 5.5 | 17.6 | 8.8 | 27.5 | 17.7 | 12.0 |
| Outer layer | 95 | 23 | 55 | 20 | 70 | 9 | 32 |
| Inner layer | 4 | 0.9 | 1.6 | 2.0 | 20 | 20 | 3.4 |
| Film Properties: | | | | | | | |
| Appearance | normal | normal | normal | normal | normal | normal | normal |
| Degree of swelling with toluene (%) | 46 | 58 | 48 | 55 | 50 | 48 | 49 |
| Water absorption (%) | 12 | 6 | 12 | 15 | 28 | 21 | 16 |
| Resistance to whitening on contact with water (color of film): | | | | | | | |
| 20° C. | pale blue | pale blue | colorless | pale blue | pale blue | pale blue | pale blue |
| 40° C. | pale blue | pale blue | pale blue | pale blue | pale blue | pale blue | pale blue |
| Coating Properties: | | | | | | | |
| Roll coating properties | good | good | good | good | good | good | good |
| Tack-free time (min) | 26 | 18 | 24 | 18 | 24 | 22 | 21 |
| Appearance of coat | normal | normal | normal | normal | normal | normal | normal |
| Resistance to whitening with water (40° C.) | no change | pale blue | no change | no change | no change | pale blue | no change |
| Resistance to softening with water (40° C.) | good | good | good | good | good | good | good |
| Antiblocking properties | good | good | good | good | good | good | good |

TABLE 4

|  | Example 8 | Example 9 | Compar. Example 1 | Compar. Example 2 | Compar. Example 3 | Compar. Example 4 | Compar. Example 5 |
|---|---|---|---|---|---|---|---|
| Degree of Solubilization (%): | | | | | | | |
| Whole | 22.3 | 47.5 | 11.3 | 6.7 | 3.6 | 55 | 3.6 |

TABLE 4-continued

|  | Example 8 | Example 9 | Compar. Example 1 | Compar. Example 2 | Compar. Example 3 | Compar. Example 4 | Compar. Example 5 |
|---|---|---|---|---|---|---|---|
| Outer layer | 70 | 90 | 95 | 15 | 2 | 95 | 4 |
| Inner layer | 1.8 | 40 | 4 | 4 | 4 | 28 | 3.4 |
| Film Properties: | | | | | | | |
| Appearance | tacky | normal | normal | normal | wrinkles | normal | wrinkles |
| Degree of swelling with toluene (%) | 75 | 50 | 68 | 82 | 58 | 56 | 58 |
| Water absorption (%) | 13 | 42 | 22 | 15 | 12 | 48 | 11 |
| Resistance to whitening on contact with water (color of film): | | | | | | | |
| 20° C. | colorless | pale blue | pale blue | pale blue | bluish white | pale blue | pale blue |
| 40° C. | pale blue | pale blue | bluish white | bluish white | white | pale blue | bluish white |
| Coating Properties: | | | | | | | |
| Roll coating properties | good | good | good | medium | poor | good | medium |
| Tack-free time (min) | 28 | 28 | 24 | 14 | 8 | 28 | 27 |
| Appearance of coat | tacky | normal | normal | normal | lack of smoothness | normal | lack of smoothness |
| Resistance to whitening with water (40° C.) | no change | no change | pale blue | pale blue | white | no change | pale blue |
| Resistance to softening with water (40° C.) | good | poor | medium | medium | good | poor | good |
| Antiblocking properties | poor | good | medium | poor | good | good | good |

EXAMPLE 10

A reactor equipped with a temperature controller, an anchor stirrer, a reflux condenser, a feeder, a thermometer, and an inlet for nitrogen was purged with nitrogen, and the following composition was charged therein.

| Water | 35 parts |
|---|---|
| Sodium salt of a sulfuric acid half-ester of an ethylene oxide (20 mol) adduct of p-nonyl phenol (hereinafter referred to as anionic emulsifying agent A) (35% aqueous solution) | 1.8 parts |
| Ethylene oxide (25 mol) adduct of p-nonyl phenol (hereinafter referred to as nonionic emulsifying agent B) (20% aqueous solution) | 2 parts |

Separately, mixtures I, II and III having the following compositions were prepared.

| Mixture I: | |
|---|---|
| Water | 35 parts |
| 35% Aqueous solution of anionic emulsifying agent A | 3.7 parts |
| 20% Aqueous solution of nonionic emulsifying agent B | 3.5 parts |
| Styrene | 37.5 parts |
| Butyl acrylate | 37.1 parts |
| Diacetone acrylamide | 4.0 parts |
| Acrylic acid | 0.4 part |
| Mixture II: | |
| Water | 8 parts |
| 35% Aqueous solution of anionic emulsifying agent A | 0.8 part |
| 20% Aqueous solution of nonionic emulsifying agent B | 1.05 part |
| Styrene | 1.5 parts |
| Methyl methacrylate | 3.6 parts |
| Butyl acrylate | 13.9 parts |
| Diacetone acrylamide | 1.0 part |
| Acrylic acid | 1.0 part |
| t-Dodecylmercaptan | 0.2 part |
| Mixture III: | |
| Water | 12 parts |
| Potassium persulfate | 0.5 part |

To the reactor was added 10% of mixture I, and the resulting mixture was heated to 85° C. Ten percents of mixture III was fed. Ten minutes later, the rest of mixture I was added thereto over a period of 3 hours. After one hour from the completion of addition of mixture I, mixture II was slowly fed to the reactor over 1 hour. The rest of mixture III was continuously fed at a constant rate from the start of addition of mixture I to the end of addition of mixture II. After the addition, the reaction mixture was maintained at 90° C. for an additional period of 1.5 hours to complete emulsion polymerization. The resulting aqueous resin dispersion had a nonvolatile content of about 50%.

The aqueous resin dispersion was adjusted to a pH of 9.2 with aqueous ammonia, and to the dispersion were added parts of benzyl alcohol as a solvent, 25.7 parts of a 20% aqueous solution of adipic acid dihydrazide, and 2.6 parts of ethylene glycol diglycidyl ether to obtain an aqueous adhesive composition. The degree of solubilization of the outer layer resin, the inner layer resin, and the whole particles was 95%, 1.5%, and 21.2%, respectively.

EXAMPLES 11 TO 21 AND COMPARATIVE EXAMPLES 6 TO 8 AND 10 TO 12

An aqueous adhesive composition was prepared in the same manner as in Example 10, except for making alterations as shown in Tables 5 to 7 below. The amounts of water and emulsifying agents in each of mixtures to be fed were distributed in each layer in proportion to the weight of the respective monomer mixture.

COMPARATIVE EXAMPLE 9

A hundred parts (solid basis) of an aqueous resin dispersion "Acronal YJ-2730D" (produced by Mitsubishi Yuka Badische Co., Ltd.) were mixed with 100 parts of a 20% aqueous solution of water-soluble polyvinyl alcohol "GH-17" (produced by Nippon Synthetic glycol diglycidyl ether to obtain an aqueous adhesive composition.

TABLE 5

|  | Example 10 | Example 11 | Example 12 | Example 13 | Example 14 | Example 15 |
|---|---|---|---|---|---|---|
| Monomer Composition (part): | | | | | | |
| Inner Layer: | | | | | | |
| Diacetone acrylamide | 4.0 | 4.0 | 9.2 | 9.2 | 3.5 | 3.5 |
| Acrylic acid | 0.4 | 0.4 | 1.8 | 1.8 | 1.0 | 1.0 |
| Methacrylic acid | — | — | — | — | — | — |
| Methyl methacrylate | — | — | 53.4 | 53.4 | 26.2 | 26.2 |
| Butyl acrylate | 37.1 | 37.1 | 27.6 | 27.6 | — | — |
| 2-Ethylhexyl acrylate | — | — | — | — | 39.3 | 39.3 |
| Styrene | 37.5 | 37.5 | — | — | — | — |
| 2-Hydroxyethyl acrylate | — | — | — | — | — | — |
| Outer Layer: | | | | | | |
| Diacetone acrylamide | 1.0 | 1.0 | 0.4 | 0.4 | 1.4 | 1.4 |
| Acrylic acid | 1.0 | 1.0 | 0.4 | 0.4 | 3.6 | 3.6 |
| Methacrylic acid | — | — | — | — | 2.1 | 2.1 |
| Methyl methacrylate | 3.6 | 3.6 | 1.4 | 1.4 | 12.1 | 12.1 |
| Butyl acrylate | 13.9 | 13.9 | 5.2 | 5.2 | — | — |
| 2-Ethylhexyl acrylate | — | — | — | — | 10.8 | 10.8 |
| Styrene | 1.5 | 1.5 | 0.6 | 0.6 | — | — |
| t-Dodecylmercaptan | 0.2 | 0.2 | 0.1 | 0.1 | 0.3 | 0.3 |
| Solvent (part) | BA (6.0) | BA (14.0) | BA (10.0) | BA (10.0) | BC (15.0) | BC (15.0) |
| Alkali (pH) | AQ (9.2) | — (2.8) | AQ (9.3) | AQ (9.3) | AQ (9.3) | AQ (6.8) |
| Hydrazine derivative (part) | ADH (25.7) | ADH (13.1) | SDH* (31.6) | ADH (38.3) | ADH (31.5) | ADH (15.7) |
| Epoxy-containing compound (part) | EG (2.6) | GG (4.6) | GG (5.4) | EG (2.7) | EG (1.9) | EG (10.0) |
| Carbonyl + epoxy/hydrazino molar ratio | 1.0 | 2.5 | 2.0 | 1.0 | 0.7 | 4.0 |

TABLE 6

|  | Example 16 | Example 17 | Example 18 | Example 19 | Example 20 | Compar. Example 6 |
|---|---|---|---|---|---|---|
| Monomer Composition (part): | | | | | | |
| Inner Layer: | | | | | | |
| Diacetone acrylamide | 3.5 | — | 4.0 | 3.0 | 3.5 | 6.5 |
| Acrylic acid | 1.0 | 0.3 | 1.1 | 0.6 | 1.4 | 1.3 |
| Methacrylic acid | — | 0.3 | — | — | — | — |
| Methyl methacrylate | 26.2 | 22.1 | 38.4 | — | 23.1 | 37.7 |
| Butyl acrylate | — | 29.8 | — | 27.3 | 28.0 | 19.5 |
| 2-Ethylhexyl acrylate | 39.3 | — | 35.5 | — | — | — |
| Styrene | — | 7.2 | — | 29.1 | 14.0 | — |
| 2-Hydroxyethyl acrylate | — | 0.3 | — | — | — | — |
| Outer Layer: | | | | | | |
| Diacetone acrylamide | 1.4 | 6.0 | 0.5 | 4.0 | 3.0 | — |
| Acrylic acid | 3.6 | 1.0 | 1.5 | 0.8 | 0.9 | 2.5 |
| Methacrylic acid | 2.1 | — | — | — | — | — |
| Methyl methacrylate | 12.1 | 17.8 | 13.8 | 23.2 | 14.1 | 25.5 |
| Butyl acrylate | — | 5.2 | — | 12.0 | 12.0 | — |
| 2-Ethylhexyl acrylate | 10.8 | — | 5.2 | — | — | 7.0 |
| Styrene | — | — | — | — | — | — |
| t-Dodecylmercaptan | 0.3 | 0.4 | 0.2 | 0.4 | 0.1 | 0.3 |
| Solvent (part) | — | BC (12.0) | texanol (6.0) | BA (10.0) | BA (12.0) | BA (10.0) |
| Alkali (pH) | SH (9.5) | AQ (9.2) | AQ (9.2) | AQ (9.3) | AQ (9.0) | AQ (9.3) |
| Hydrazine derivative (part) | ADH (15.7) | ADH (18.3) | ADH (15.1) | ADH (16.7) | ADH (17.7) | ADH (16.7) |
| Epoxy-containing compound (part) | EG (2.2) | EG (1.3) | GG (4.3) | GG (3.6) | EG (3.1) | EG (1.7) |
| Carbonyl + epoxy/hydrazino molar ratio | 1.5 | 1.2 | 2.0 | 2.0 | 1.8 | 1.5 |

Chemical Industry Co., Ltd.) and 6 parts of ethylene

TABLE 7

|  | Compar. Example 7 | Compar. Example 8 | Compar. Example 9 | Example 21 | Compar. Example 10 | Compar. Example 11 | Compar. Example 12 |
|---|---|---|---|---|---|---|---|
| Monomer Composition (part): | | | | | | | |
| Inner Layer: | | | | | | | |
| Diacetone acrylamide | 4 | 7.9 | — | 3.5 | 9.2 | 3.0 | 3.5 |
| Acrylic acid | 10.2 | 1.6 | — | 1.0 | 1.8 | 0.6 | 1.4 |
| Methacrylic acid | 6.0 | — | — | — | — | — | — |

TABLE 7-continued

|  | Compar. Example 7 | Compar. Example 8 | Compar. Example 9 | Example 21 | Compar. Example 10 | Compar. Example 11 | Compar. Example 12 |
|---|---|---|---|---|---|---|---|
| Methyl methacrylate | 34.2 | 45.8 | — | 26.2 | 53.4 | — | 23.1 |
| Butyl acrylate | — | 23.7 | — | — | 27.6 | 27.3 | 28.0 |
| 2-Ethylhexyl acrylate | 30.6 | — | — | 39.3 | — | — | — |
| Styrene | — | — | — | — | — | 29.1 | 14.0 |
| 2-Hydroxyethyl acrylate | — | — | — | — | — | — | — |
| Outer Layer: |  |  |  |  |  |  |  |
| Diacetone acrylamide | 0.7 | 1.1 | — | 1.4 | 0.4 | 2.0 | 3.0 |
| Acrylic acid | 1.8 | 0.3 | — | 3.6 | 0.4 | 2.0 | 0.9 |
| Methacrylic acid | 1.1 | — | — | 2.1 | — | — | — |
| Methyl methacrylate | 6.0 | 10.2 | — | 12.1 | 1.4 | 7.0 | 14.1 |
| Butyl acrylate | — | — | — | — | 5.2 | 26.0 | 12.0 |
| Styrene | 5.4 | 9.4 | — | 10.8 | — | — | — |
| 2-Hydroxyethyl acrylate | — | — | — | — | 0.6 | 3.0 | — |
| t-Dodecylmercaptan | 0.2 | 0.2 | — | 0.3 | 0.1 | 0.4 | — |
| Solvent (part) | BC (15.0) | BC (16.0) | — | BC (15.0) | BA (10.0) | BA (10.0) | BA (12.0) |
| Alkali (pH) | AQ (6.8) | AQ (9.3) | — | AQ (9.3) | AQ (9.3) | AQ (9.3) | AQ (9.0) |
| Hydrazine derivative (part) | ADH (14.8) | ADH (23.2) | — | ADH (8.5) | ADH (38.0) | ADH (16.7) | ADH (17.7) |
| Epoxy-containing compound (part) | EG (3.5) | EG (2.3) | EG (6.0) | EG (14.4) | — | EG (2.4) | EG (3.1) |
| Carbonyl + epoxy/hydrazino molar ratio | 2.0 | 1.5 | — | 10.0 | 0.6 | 1.5 | 1.8 |

Note: *a 20% aqueous solution of sebacic acid dihydrazide.

Each of the aqueous adhesive compositions prepared in Examples 10 to 21 and Comparative Examples 6 to 12 was evaluated according to the following test methods. The composition and specimens prepared were previously aged at 20°±1° C. and 65±10% RH for 3 days before testing. The results obtained are shown in Tables 8 to 10 below.

11) Pot Life:

Gelation of the composition was observed. The number of days required for gelation was taken as a pot life.

12) Open Time:

The composition was applied to a straight-grained birch plate having a thickness of 10 mm and a width of 25 mm to a thickness of 200 g/m². The surface of the coated layer was touched with a finger every 2 minutes to determine the time required for becoming tack-free.

13) Compression Shear Strength after Repetition of Boiling:

The composition was applied to a pair of straight-grained birch plates each having a thickness of 10 mm and a width of 25 mm to a thickness of 150±40 g/m² each. After allowing the coated plates for 5 minutes, the two plates were joined together to an overlap of 25 mm in length. After pressing the joint at 6 to 8 kg/cm² for 24 hours, the specimen was aged for 3 days, and then subjected to a repeated boiling test according to JIS K-6852-5.4.

TABLE 8

|  | Example 10 | Example 11 | Example 12 | Example 13 | Example 14 | Example 15 |
|---|---|---|---|---|---|---|
| Degree of Solubilization (%): |  |  |  |  |  |  |
| Whole | 21.2 | 5.5 | 7.7 | 11.3 | 22.3 | 8.4 |
| Outer layer | 95 | 23 | 62 | 95 | 70 | 25 |
| Inner layer | 1.5 | 0.9 | 3 | 4 | 1.8 | 1.3 |
| Results of Evaluation: |  |  |  |  |  |  |
| Pot life (day) | >30 | >30 | 25 | 30 | >30 | >30 |
| Open time (min) | 30 | 15 | 25 | 30 | 30 | 20 |
| Compression shear strength after repetition of boiling | 50 | 45 | 56.5 | 48 | 61 | 52.5 |

TABLE 9

|  | Example 16 | Example 17 | Example 18 | Example 19 | Example 20 | Example 21 |
|---|---|---|---|---|---|---|
| Degree of Solubilization (%): |  |  |  |  |  |  |
| Whole | 18.5 | 8.8 | 10 | 6.8 | 12 | 22.3 |
| Outer layer | 55 | 20 | 40 | 5 | 32 | 70 |
| Inner layer | 2.6 | 2 | 2 | 8 | 3.4 | 1.8 |
| Results of Evaluation: |  |  |  |  |  |  |
| Pot life (day) | >30 | >30 | >30 | >30 | >30 | 20 |
| Open time (min) | 30 | 20 | 25 | 15 | 20 | 25 |
| Compression shear strength after repetition of boiling | 41.5 | 43.5 | 51.5 | 46 | 43 | 16 |

TABLE 10

|  | Compar. Example 6 | Compar. Example 7 | Compar. Example 8 | Compar. Example 9 | Compar. Example 10 | Compar. Example 11 | Compar. Example 12 |
| --- | --- | --- | --- | --- | --- | --- | --- |
| Degree of Solubilization (%): | | | | | | | |
| Whole | 6.7 | 25.8 | 3.6 | — | 11.3 | 42.8 | 3.6 |
| Outer layer | 15 | 30 | 2 | — | 95 | 95 | 4 |
| Inner layer | 4 | 25 | 4 | — | 4 | 8 | 3.4 |
| Results of Evaluation: | | | | | | | |
| Pot life (day) | >30 | 25 | >30 | 2 | — | 25 | >30 |
| Open time (min) | 15 | 30 | 5 | 25 | 35 | 30 | 6 |
| Compression shear strength after repetition of boiling | 16.7 | 11.5 | 3–30.5 | 40.5 | 9.5 | 6 | 6–35 |

The aqueous dispersed resin composition according to the present invention easily undergoes crosslinking at room temperature to provide a film excellent in water resistance, resistance to whitening on contact with water, antiblocking properties, heat resistance, solvent resistance, adhesion, and hardness. The composition exhibits controllable drying properties and thereby has satisfactory workability. The composition does not undergo gelation and is easy to handle.

The present invention provides an adhesive composition which has a long pot life and a moderate open time, is easy to handle, and provides an adhesive film excellent in water resistant adhesion.

The composition of the present invention is suitable for adhesion of porous substrates, such as wood, plywood, particle boards, hardboards, corrugated boards, paperboards, and kraft paper, among themselves or to non-water-absorbing substrates, such as glass, metal, plastics, and rubber articles.

While the invention has been described in detail and with reference to specific examples thereof, it will be apparent to one skilled in the art that various changes and modifications can be made therein without departing from the spirit and scope thereof.

What is claimed is:

1. An aqueous dispersed resin composition comprising (A) an aqueous dispersion of carbonyl-containing resin particles having an inner layer and an outermost layer, which is obtained by emulsion polymerization of a monomer mixture comprising (a) not less than 0.5% by weight of a carbonyl-containing monomer containing at least one aldo group or keto group and one polymerizable unsaturated double bond in the molecule thereof, (b) not less than 0.5% by weight of an ethylenically unsaturated carboxylic acid, (c) not more than 99% by weight of a monomer having a water-solubility of not more than 8 g/100 ml at 20° C., and (d) not more than 99% by weight of an unsaturated monomer other than the monomers (a) to (c) in an aqueous medium in the presence of dispersed resin particles serving as an inner layer, (B) a hydrophilic hydrazine compound containing at least two hydrazino groups in the molecule thereof, and (C) an epoxy-containing compound containing at least two epoxy groups in the molecule thereof, in which the resin constituting said outermost layer of said carbonyl-containing resin particles has a degree of solubilization of at least 5% by weight, and the resin constituting the whole resin particles has a degree of solubilization of from 4 to 50% by weight.

2. An aqueous dispersed resin composition as claimed in claim 1, wherein the resin of said outermost layer of said carbonyl-containing resin particles has a degree of solubilization of not less than 15% by weight.

3. An aqueous dispersed resin composition as claimed in claim 1, wherein the resin constituting said inner layer of said carbonyl-containing resin particles has a degree of solubilization of less than 30% by weight.

4. An aqueous dispersed resin composition as claimed in claim 2, wherein the resin constituting said inner layer of said carbonyl-containing resin particles has a degree of solubilization of from 0.3 to 25% by weight.

5. An aqueous dispersed resin composition as claimed in claim 3, wherein the resin constituting said inner layer of said carbonyl-containing resin particles has a degree of solubilization of from 0.3 to 25% by weight.

6. An aqueous dispersed resin composition as claimed in claim 1, wherein component (C) is present in an amount of from 0.1 to 100 parts by weight per 100 parts by weight of the solids content of component (A).

7. An aqueous dispersed resin composition as claimed in claim 6, wherein component (C) is present in an amount of from 0.3 to 60 parts by weight per 100 parts by weight of the solids content of component (A).

8. An aqueous dispersed resin composition as claimed in claim 1, wherein the molar ratio of the sum of the carbonyl groups in said carbonyl-containing resin particles of component (A) and the epoxy groups in component (C) to the hydrazino groups in component (B) is from 0.2 to 8.

9. An aqueous dispersed resin composition as claimed in claim 8, wherein the molar ratio of the sum of the carbonyl groups in said carbonyl-containing resin particles of component (A) and the epoxy groups in component (C) to the hydrazino groups in component (B) is from 0.5 to 4.

10. An aqueous dispersed resin composition as claimed in claim 1, wherein said outermost layer of said carbonyl-containing resin particles of component (A) is formed by emulsion polymerization of a monomer mixture comprising (a) not less than 0.5% by weight of a carbonyl-containing monomer containing at least one aldo group or keto group and one polymerizable unsaturated double bond in the molecule thereof, (b) from 0.5 to 5% by weight of an ethylenically unsaturated carboxylic acid, (c) 30 to 99% by weight of a monomer having a water-solubility of not more than 8 g/100 ml at 20° C., and (d) not more than 69% by weight of an unsaturated monomer other than the monomers (a) to (c) in the presence of a chain transfer agent.

11. An aqueous dispersed resin composition as claimed in claim 10, wherein said outermost layer of said carbonyl-containing resin particles of component (A) is formed by emulsion polymerization of a monomer mixture comprising (a) from 2 to 20% by weight of a carbonyl-containing monomer containing at least one aldo group or keto group and one polymerizable unsaturated double bond in the molecule thereof, (b) from 2 to 5% by weight of an ethylenically unsaturated carboxylic acid, (c) from 55 to 96% by weight of a monomer having a water-solubility of not more than 8 g/100 ml at 20° C., and (d) not more than 15% by weight of an unsaturated monomer other than the monomers (a) to (c) in the presence of a chain transfer agent.

12. An aqueous dispersed resin composition as claimed in claim 1, wherein said outermost layer of said carbonyl-containing resin particles of component (A) is formed by emulsion polymerization of a monomer mixture comprising (a) from 2 to 20% by weight of a carbonyl-containing monomer containing at least one aldo group or keto group and one polymerizable unsaturated double bond in the molecule thereof, (b) from 5 to 40% by weight of an ethylenically unsaturated carboxylic acid, (c) from 55 to 93% by weight of a monomer having a water-solubility of not more than 8 g/100 ml at 20° C., and (d) not more than 15% by weight of an unsaturated monomer other than the monomers (a) to (c).

13. An aqueous dispersed resin composition as claimed in claim 12, wherein said emulsion polymerization is carried out in the presence of a chain transfer agent.

14. An aqueous dispersed resin composition as claimed in claim 10, wherein said chain transfer agent is used in an amount of from 0.02 to 2.5% by weight based on the charged monomer mixture for forming the outermost layer.

15. An aqueous dispersed resin composition as claimed in claim 13, wherein said chain transfer agent is used in an amount of from 0.02 to 2.5% by weight based on the charged monomer mixture for forming the outermost layer.

16. An aqueous dispersed resin composition as claimed in claim 1, wherein said inner layer of said carbonyl-containing resin particles of component (A) is formed by emulsion polymerization of a monomer mixture comprising (a) not less than 0.5% by weight of a carbonyl-containing monomer containing at least one aldo group or keto group and one polymerizable unsaturated double bond in the molecule thereof, (b) not more than 4% by weight of an ethylenically unsaturated carboxylic acid, (c) not more than 99.5% by weight of a monomer having a water-solubility of not more than 8 g/100 ml at 20° C., and (d) not more than 69% by weight of an unsaturated monomer other than the monomers (a) to (c).

17. An aqueous dispersed resin composition as claimed in claim 16, wherein said inner layer of said carbonyl-containing resin particles of component (A) is formed by emulsion polymerization of a monomer mixture comprising (a) from 1 to 15% by weight of a carbonyl-containing monomer containing at least one aldo group or keto group and one polymerizable unsaturated double bond in the molecule thereof, (b) from 0.5 to 3% by weight of an ethylenically unsaturated carboxylic acid, (c) from 82 to 98.5% by weight of a monomer having a water-solubility of not more than 8 g/100 ml at 20° C., and (d) not more than 15% by weight of an unsaturated monomer other than the monomers (a) to (c).

* * * * *